United States Patent
Stroomer et al.

(10) Patent No.: US 9,288,252 B2
(45) Date of Patent: Mar. 15, 2016

(54) MANAGING WEB SERVICES USING A REVERSE PROXY

(71) Applicant: Disney Enterprises, Inc., Burbank, CA (US)

(72) Inventors: Jeffrey D. Stroomer, Lafayette, CO (US); Philip Bryn James-Roxby, Longmont, CO (US); Sean A. Kelly, Boulder, CO (US); Raul E. Rangel, Golden, CO (US)

(73) Assignee: Disney Enterprises, Inc., Burbank, CA (US)

( * ) Notice: Subject to any disclaimer, the term of this patent is extended or adjusted under 35 U.S.C. 154(b) by 386 days.

(21) Appl. No.: 13/833,387

(22) Filed: Mar. 15, 2013

(65) Prior Publication Data

US 2014/0280473 A1    Sep. 18, 2014

(51) Int. Cl.
*H04L 29/08* (2006.01)

(52) U.S. Cl.
CPC ............ *H04L 67/02* (2013.01); *H04L 67/1027* (2013.01); *H04L 67/2814* (2013.01)

(58) Field of Classification Search
None
See application file for complete search history.

(56) References Cited

U.S. PATENT DOCUMENTS

| 6,374,297 | B1 * | 4/2002 | Wolf et al. | 709/226 |
|---|---|---|---|---|
| 7,380,003 | B1 * | 5/2008 | Guo et al. | 709/226 |
| 7,882,501 | B1 * | 2/2011 | Carlson et al. | 717/167 |
| 2006/0242298 | A1 * | 10/2006 | McAfee | 709/226 |
| 2008/0162699 | A1 * | 7/2008 | Gaffney | 709/226 |
| 2009/0248786 | A1 * | 10/2009 | Richardson et al. | 709/201 |

OTHER PUBLICATIONS

AB testing wtih nginx, Forum: NGINX, retrieved Mar. 14, 2013, <http://www.ruby-forum.com/topic/198515>.

\* cited by examiner

*Primary Examiner* — Nicholas Taylor
*Assistant Examiner* — Clayton R Williams
(74) *Attorney, Agent, or Firm* — Patterson + Sheridan, LLP

(57) ABSTRACT

Method, system, and computer program product to manage traffic in a web services cluster using a programmable reverse proxy, by providing the reverse proxy in the cluster, the cluster hosting web services, defining, in a routing table in the reverse proxy, stacks and a weight for each stack, each stack including at least one version of a web service, receiving, at the reverse proxy, a URL requesting to access a web service, selecting one of a first stack and a second stack based on the weights of each stack, the first stack specifying a first version of the web service, the second stack specifying a second version of the web service, each of the first stack and the second stack selected at least once in a plurality of requests, and generating, at the reverse proxy, a URL directed to the version of the web service specified by the selected stack.

27 Claims, 4 Drawing Sheets

| STACK NAME 401 | S1 | S2 | S3 | S4 |
|---|---|---|---|---|
| VOTING VERSION 402 | 1.2.3 | 1.2.3 | 1.2.4 | 1.2.4 |
| VOTING_ADMIN VERSION 403 | 2.4.5 | 2.4.6 | 2.4.5 | 2.4.6 |
| STACK WEIGHT 404 | 95% | 0% | 0% | 5% |

MANAGING WEB SERVICES USING A REVERSE PROXY

BACKGROUND

1. Field of the Invention

Embodiments disclosed herein relate to the field of computer software. More specifically, embodiments disclosed herein relate to managing traffic flow in a web services cluster using a reverse proxy.

2. Description of the Related Art

A web services cluster often runs dozens of services side-by-side. Services are software, which means they may evolve over time, and may fail. Clusters may handle live traffic at all times, so changing the software in a cluster often requires a "hot update," i.e., making the change while the cluster continues to handle requests. Services may call other services— for example, a transcoding service may save images by calling a storage service. Therefore, traffic in a web services cluster must be effectively managed.

SUMMARY

Embodiments disclosed herein provide a method, system, and computer program product to manage traffic in a web services cluster using a programmable reverse proxy, by providing the reverse proxy in the web services cluster, the web services cluster hosting a plurality of web services, defining, in a routing table in the reverse proxy, a plurality of stacks and a weight for each respective stack, each stack including at least one version of at least one of the plurality of web services, receiving, at the reverse proxy, a URL indicating a request to access a first web service, of the plurality of web services, selecting one of a first stack and a second stack, of the plurality of stacks, based on the respective weights of each stack, the first stack specifying a first version of the first web service, the second stack specifying a second version of the first web service, each of the first stack and the second stack selected at least once for a plurality of requests, and generating, at the reverse proxy, an outgoing URL directed to the version of the first web service specified by the selected one of the first stack and the second stack.

BRIEF DESCRIPTION OF THE DRAWINGS

So that the manner in which the above recited aspects are attained and can be understood in detail, a more particular description of embodiments of the invention, briefly summarized above, may be had by reference to the appended drawings.

It is to be noted, however, that the appended drawings illustrate only typical embodiments of this invention and are therefore not to be considered limiting of its scope, for the invention may admit to other equally effective embodiments.

DETAILED DESCRIPTION

Figure 1:
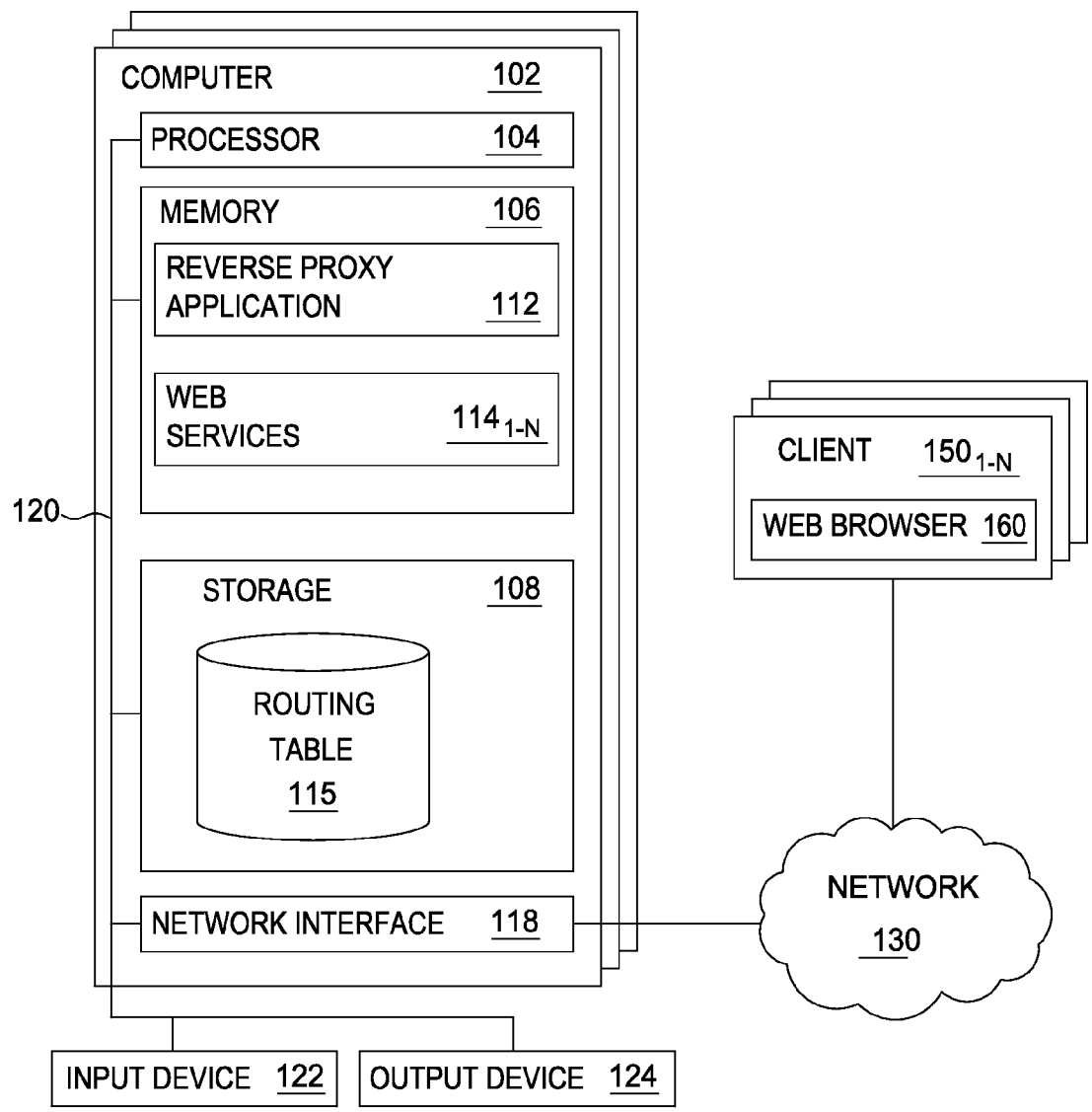
FIG. 1 is a block diagram illustrating a web services cluster implementing a programmable reverse proxy to manage cluster traffic, according to one embodiment disclosed herein.

Embodiments disclosed herein describe techniques for managing traffic flow in a web services cluster based on a programmable reverse proxy. Embodiments disclosed herein allow cluster traffic flow to be changed quickly and on the fly, and when necessary to revert to a previously used version that is known to be good. The traffic flow may be adjusted with nothing more than configuration changes while the cluster continues to operate. A new version of a service may be added to the cluster by making it available in the cluster, but assigning it little or no traffic. When a new version is added in this way, there is essentially no risk that an already running version of some other service will fail as a consequence. Even when no traffic is automatically directed to the new version, requests can explicitly be forced to employ it. This allows the new version to be tested prior to assigning it live traffic. When the new version is ready for live traffic, it can be tried "toe in the water" by assigning a majority of the traffic (95%, for example) to the older, stable version, and assigning a smaller percentage (5% in this example) to the new version. Once the new version has been confirmed to be stable or suitable for deployment, all (or a majority) of the traffic may be assigned to the new version.

Embodiments disclosed herein implement a routing table in the reverse proxy. The routing table may include a plurality of "stacks," each stack having its own name and weight. A stack, as used herein, is a mapping that translates abstract web service names into corresponding concrete service versions. In one embodiment, each web service in the cluster has its own name and corresponding version. For example, two versions of an online voting service having an abstract name of "voting" may be executing in the web services cluster. The first concrete version may be "voting 1.2.3," and the second concrete version may be "voting 1.2.4." A first stack S1 in the routing table may specify an association of the name "voting" with voting 1.2.3, and a second stack S2 may specify an association of "voting" with voting 1.2.4. Each stack in the routing table may be assigned a specific weight. For example, stack S1 may have a weight such that it receives roughly 95% of the traffic flow, whereas stack S2 may have a weight such that it receives roughly 5% of the traffic flow. When a generic request comes in for the voting service, i.e., a request that does not explicitly request a particular version or stack, the reverse proxy may choose one of S1 or S2 in a weighted way based on the weights assigned to each stack. Using the weights from the above example, therefore, the reverse proxy may select stack S1 roughly 95% of the time, and stack S2 roughly 5% of the time.

In a particular embodiment, changes to the routing table may be auto-generated from a programmatic description of the web services cluster, and may be hot-loaded into the reverse proxy system nearly instantly. Therefore, when voting 1.2.4 is determined to be stable, and therefore suitable for live traffic, the weights of S1 and S2 may be updated so that they receive 0% and 100%, respectively, such that all traffic goes to S2 and voting 1.2.4, and no traffic goes to S1 and voting 1.2.3 (which may be assigned as a standby in case of a failure). In case of a failure by voting 1.2.4, the same weight shifting mechanism may be employed to assign 100% of traffic to voting 1.2.3, and 0% to voting 1.2.4. The effect is that a mistake can be backed out nearly instantly.

While embodiments disclosed herein are described with reference to testing new versions of web services, this particular use case is exemplary, and should not be considered limiting of the disclosure. Embodiments disclosed herein generally describe techniques for using a reverse proxy to manage traffic in a web cluster providing a plurality of web services.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from any-where across the Internet. In context of the present invention, a user may access reverse proxy applications or related data available in the cloud. For example, the reverse proxy application could execute on a computing system in the cloud and manage web services. In such a case, the reverse proxy application could direct traffic between different versions of a web services application and store stacks weights at a storage location in the cloud. Doing so allows a user to access this information from any computing system attached to a network connected to the cloud (e.g., the Internet).

FIG. 1 is a block diagram illustrating a web services cluster 100 implementing a programmable reverse proxy to manage cluster traffic, according to one embodiment disclosed herein. The networked system 100 includes a computer 102. The computer 102 may also be connected to other computers 102 in the web services cluster 100 via a network 130. In general, the network 130 may be a telecommunications network and/or a wide area network (WAN). In a particular embodiment, the network 130 is the Internet.

The computer 102 generally includes a processor 104 connected via a bus 120 to a memory 106, a network interface device 118, a storage 108, an input device 122, and an output device 124. The computer 102 is generally under the control of an operating system (not shown). Examples of operating systems include the UNIX® operating system, versions of the Microsoft® Windows® operating system, and distributions of the Linux® operating system. (UNIX is a registered trademark of The Open Group in the United States and other countries. Microsoft and Windows are trademarks of Microsoft Corporation in the United States, other countries, or both. Linux is a registered trademark of Linus Torvalds in the United States, other countries, or both.) More generally, any operating system supporting the functions disclosed herein may be used. The processor 104 is included to be representative of a single CPU, multiple CPUs, a single CPU having multiple processing cores, and the like. Similarly, the memory 106 may be a random access memory. While the memory 106 is shown as a single identity, it should be understood that the memory 106 may comprise a plurality of modules, and that the memory 106 may exist at multiple levels, from high speed registers and caches to lower speed but larger DRAM chips. The network interface device 118 may be any type of network communications device allowing the computer 102 to communicate with other computers via the network 130.

The input device 122 may be any device for providing input to the computer 102. For example, a keyboard and/or a mouse may be used. The output device 124 may be any device for providing output to a user of the computer 102. For example, the output device 124 may be any conventional display screen or set of speakers. Although shown separately from the input device 122, the output device 124 and input device 122 may be combined. For example, a display screen with an integrated touch-screen may be used.

The storage 108 may be a persistent storage device. Although the storage 108 is shown as a single unit, the storage 108 may be a combination of fixed and/or removable storage devices, such as fixed disc drives, solid state drives, floppy disc drives, tape drives, removable memory cards or optical storage. The memory 106 and the storage 108 may be part of one virtual address space spanning multiple primary and secondary storage devices.

As shown, the memory 106 contains web services $114_{1-N}$, which generally are web service applications, such as a voting application, an administration platform for the voting application, and the like. The memory 106 also contains a reverse proxy application 112, which is an application generally configured to fulfill requests for web services received from a client computer $150_{1-N}$ by selecting a stack identifying a web service $114_{1-N}$ executing in the web services cluster 100. Stated differently, the reverse proxy application 112 makes the determination of what version of a web service should be used in fulfilling a web service request. The reverse proxy application 112 may make these determinations by referencing entries in a routing table 115, described in greater detail below. One example of a reverse proxy is Varnish® from Varnish Software. The information contained in the routing table 115 may be programmatically translated into code understandable by the reverse proxy, such as a Varnish default.vcl.

Each of the web services $114_{1-N}$ may have a specific name, and are versioned, as different versions of the web services $114_{1-N}$ may exist. For example, two versions of a first web service $114_1$, an online voting service named "voting," may be executing in the web services cluster. The first version may be "voting 1.2.3," and the second version may be "voting 1.2.4." A second web service $114_2$, named "voting_admin," which may be an administrator portal for "voting," may have a version 2.4.5 and a version 2.4.6. In one embodiment, versions of the web services $114_{1-N}$ may be dependent on a specific version of another web service $114_{1-N}$. Therefore, a plurality of web services $114_{1-N}$ may be provided in the web services cluster 100. The configuration shown has been simplified for illustrative purposes, as the plurality of web services $114_{1-N}$ may be hosted on any combination of one, several or many computers 102 in the web services cluster 100. In one embodiment, the reverse proxy application 112 may be hosted on a computer 102 which does not host any of the web services $114_{1-N}$. In another embodiment, the reverse proxy application 112 and the web services $114_{1-N}$ may be hosted on different virtual machines in horizontal tiers of machines. By running the reverse proxy application 112 and the web services $114_{1-N}$ horizontal tiers of machines, each of which runs the same software, allows the web services cluster 100 to be load-balanced, and to continue to run when one or more virtual machines fail.

As shown, storage 108 contains a routing table 115, which stores a plurality of stacks. Each stack has a name and weight, and is a mapping that translates web services $114_{1-N}$ names into corresponding service versions. A first stack S1 in the routing table 115 may specify a mapping of voting with voting 1.2.3, and voting_admin with voting_admin 2.4.5. A second stack S2 may specify a mapping of voting with voting 1.2.4 and voting_admin voting_admin 2.4.6. If stack S1 is employed, then calls to voting and voting_admin are mapped by the reverse proxy application 112 to versions 1.2.3 and 2.4.5, respectively. Likewise, if stack S2 is employed, calls to voting and voting_admin are mapped by the reverse proxy application 112 to versions 1.2.4 and 2.4.6, respectively. Each stack in the routing table may be assigned a specific weight. For example, stack S1 may have a weight such that it receives 95% of the traffic flow, whereas stack S2 may have a weight such that it receives 5% of the traffic flow. Furthermore, in one embodiment, as described above, voting and voting_admin may be dependent on specific versions of each other, and the stacks may be used to enforce these dependencies. When a request is received by the reverse proxy application 112, the reverse proxy application 112 may select one of the stacks based on the weighted percentages, such that stack S1 is selected roughly 95% of the time, and stack S2 is selected roughly 5% of the time. The weighted selection of a stack may be made, for example, using a pseudo-random choice, which may be based on a hash of originating IP address and user agent, but other approaches may be employed equally well.

Although depicted as a database, the routing table 115 may take any form sufficient to store data, including text files, xml data files, and the like.

Figure 2:
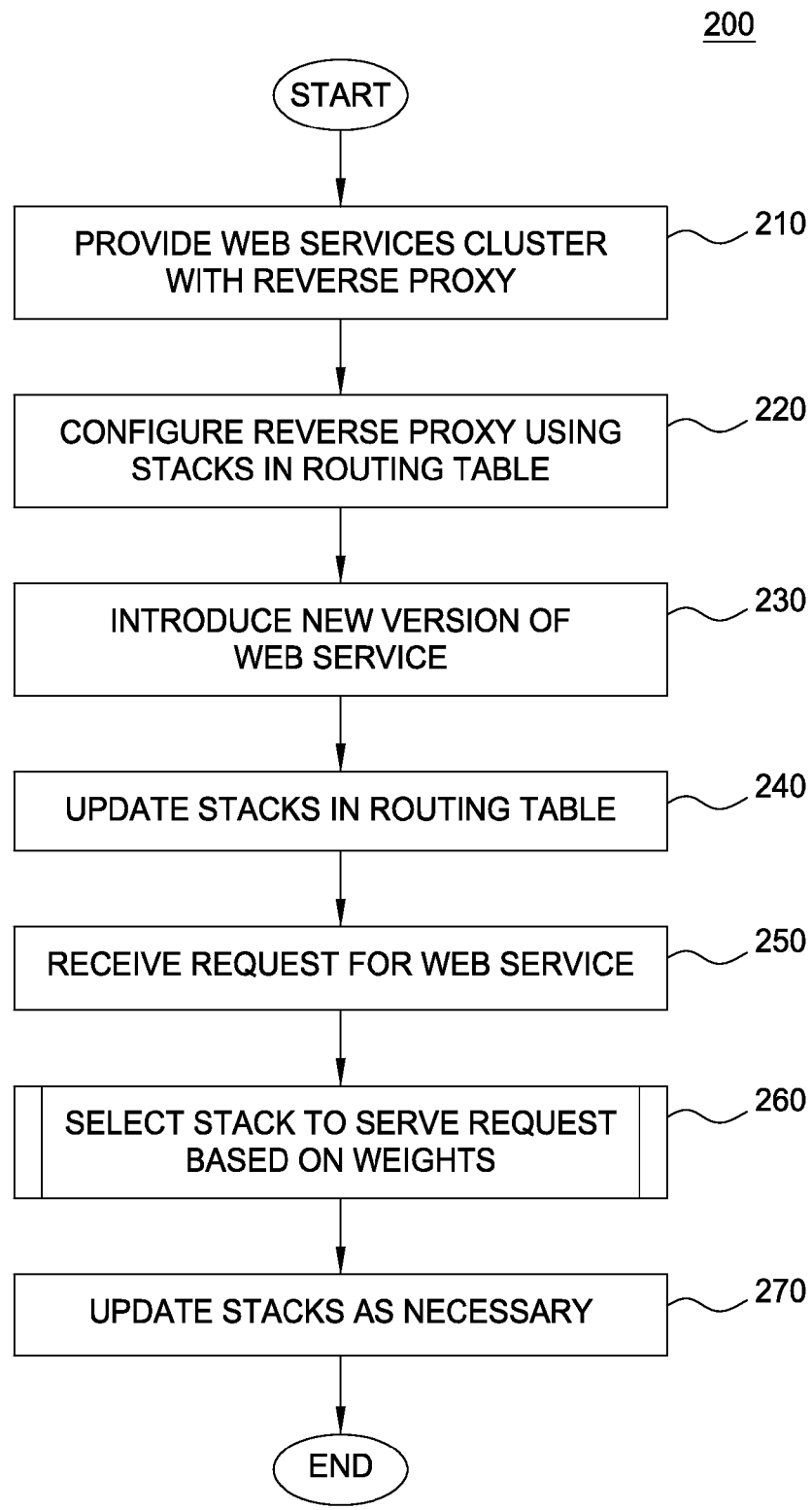
FIG. 2 is a flow chart illustrating a method to manage web services using a reverse proxy, according to one embodiment disclosed herein.

FIG. 2 is a flow chart illustrating a method 200 to manage web services using a reverse proxy, according to one embodiment disclosed herein. Generally, the method 200 allows traffic flow in a web services cluster to be adjusted quickly and on the fly, using simple and easily reversible configuration changes. At step 210, a web services cluster having a reverse proxy application, such as the reverse proxy application 112 is provided. At step 220, the reverse proxy application 112 is configured using stacks defined in a routing table 115. As described above, the stacks have a name and weight, and are used to map service names into corresponding service versions. At step 230, a new version of a web service is introduced into the web services cluster 100. For example, while voting 1.2.3 may currently be executing in the web services cluster 100 (and fulfilling all calls to voting), voting version 1.2.4 may be deployed into the web services cluster 100. At step 240, once the new version of the web service has been introduced into the web services cluster, the stacks in the routing table 115 may be updated. This step may be accomplished by editing existing stacks or creating new stacks. For example, when voting 1.2.4 is introduced, cluster administrators may want to direct generic calls to the voting web service on a limited basis, to ensure that it operates correctly and does not result in failure, degraded performance, or other issues. Allowing a small amount of live traffic to go to the new service is a real-world test for which the consequences of failure are not catastrophic. Therefore, the routing table may comprise a first stack S1 that includes voting 1.2.3, and a second stack S2 which includes voting 1.2.4. As part of the testing process with voting 1.2.4, the weights for stacks S1 and S2 may be set to 95% and 5%, respectively, to address concerns with deploying a new version of a web services application into a fully functioning web services cluster. At this point, the reverse proxy application 112 may be updated to include the new routing table 115.

At step 250, a request for a web service, such as voting, is received by the reverse proxy application 112. At step 260, the reverse proxy application 112 selects a stack in the routing table 115 to serve the request based on the respective stack weights. Therefore, using the above percentages, a generic request for voting may result in the reverse proxy application 112 choosing voting 1.2.3 roughly 95% of the time, and voting 1.2.4 roughly 5% of the time. Generally, the amount of traffic directed to each service need only roughly approximate the percentages associated to the stacks. At step 270, the stacks are updated as necessary, as part of a continuing monitoring and maintenance process for the web services cluster 100. For example, after some period of time, an administrator may feel comfortable with fully deploying voting 1.2.4, and update the weight for stacks S1 and S2 to be 0% and 100%, respectively. The example weights applied to the different stacks are merely illustrative, and any range may be applied. For example, the split may be 50% for S1 and 50% for S2. Any percentage may be applied as deemed appropriate by an administrator.

Figure 3:
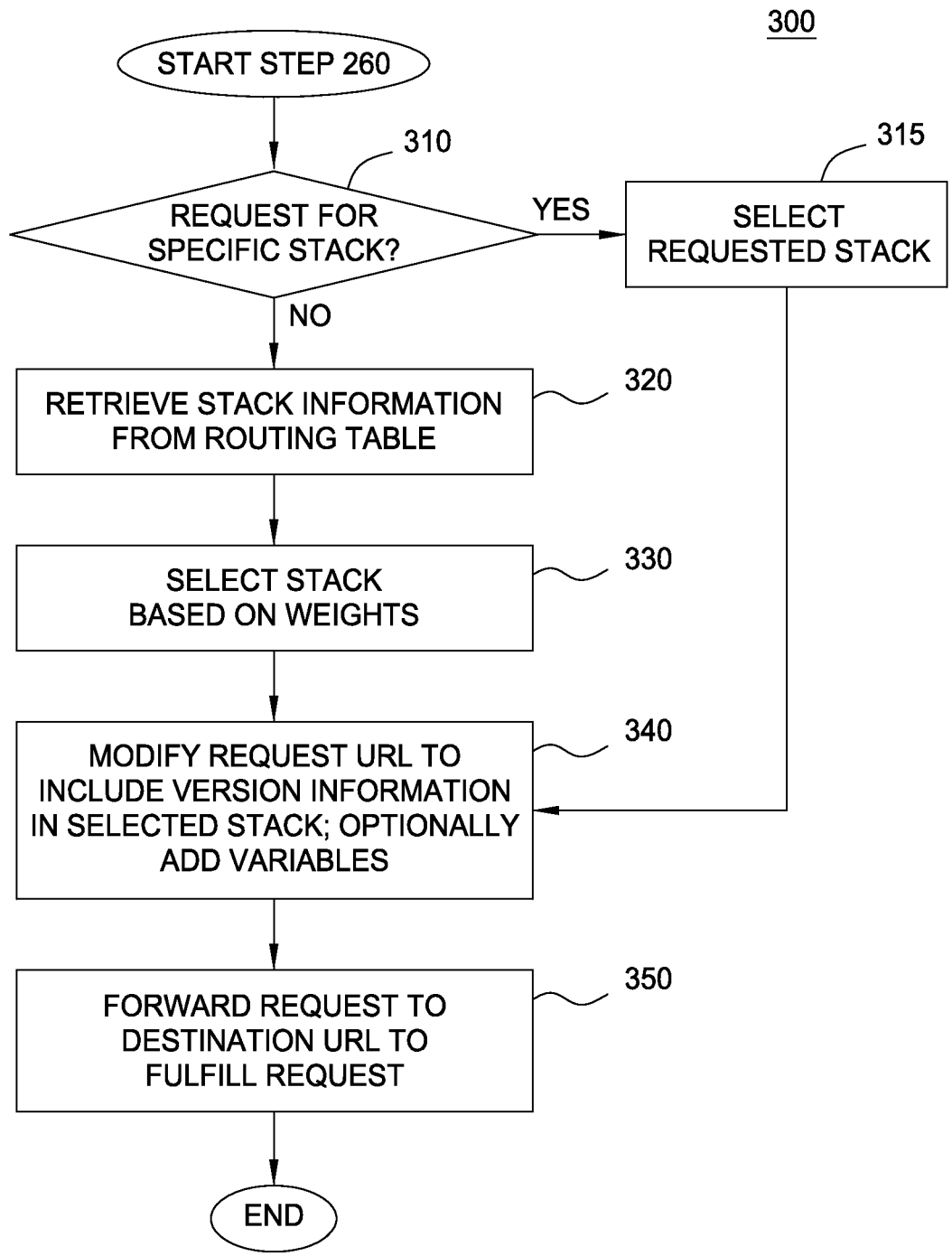
FIG. 3 is a flow chart illustrating a method to server requests for web services using a reverse proxy, according to one embodiment disclosed herein.

FIG. 3 is a flow chart illustrating a method 300 corresponding to step 260 to serve requests for web services using a reverse proxy, according to one embodiment disclosed herein. In one embodiment, the reverse proxy application 112 performs the steps of the method 300. At step 310, the reverse proxy application 112 determines whether the request specifies a specific stack or specific version of a web services application. In one embodiment, a request may explicitly force selection of a stack by using query parameters and headers. For example, a client may explicitly request stack S1, or voting 1.2.3. If the request specifies a specific stack, the reverse proxy application 112 proceeds to step 315, where the requested stack or version of the web services application is selected. If the request is generic, i.e., does not specify a particular stack or web service version, the reverse proxy application 112 proceeds to step 320. At step 32, the reverse proxy application 112 retrieves stack information from the routing table 115. At step 330, the reverse proxy application 112 selects a stack based on stack weights. For example, if stack S1 has a weight of 95% and stack S2 has a weight of 5%, the former may be selected roughly 95% of the time, and the latter may be selected roughly 5% of the time. In one embodiment, the weighted selection of a stack may be based on a pseudo-random approach implementing a hash formed from the origin IP address and user agent, although other approaches are contemplated by the disclosure. At step 340, the reverse proxy application 112 may modify the URL received in the request to generate an outgoing URL indicating the destination of the version of the web service in the selected stack. The selected stack may also be added to the outgoing URL, such that downstream calls use the same stack. Adding the selected stack to the outgoing URL may be accomplished by tagging with a query parameter or header. Additionally, in some embodiments, the reverse proxy application 112 may add headers or query parameters to the URL to trigger some additional behavior in the downstream web services. For example, a header may be set indicating that the web service should log its own activity for debugging purposes. Generally, any header or query parameter may be set by the reverse proxy application 112. At step 350, the reverse proxy application 112 forwards the request to the destination URL to fulfill the request.

Figure 4:
FIG. 4 illustrates a reverse proxy routing table, according to one embodiment disclosed herein.

FIG. 4 illustrates a reverse proxy routing table 400, according to one embodiment disclosed herein. The routing table 400 is exemplary, as embodiments disclosed herein contemplate any type of routing table or data structure. As shown, a plurality of stack names 401 have been defined, including stacks S1, S2, S3, and S4. Each stack also has an associated stack weight 405, which in this example have been defined to be 95%, 0%, 0%, and 5% for stacks S1-S4, respectively. The stack weights 405 specify the percentage of traffic which should be assigned to each stack when fulfilling web services request. Therefore, when the reverse proxy application 112 receives a request that does not specify a particular stack, the reverse proxy application 112 automatically selects a stack in a weighted way. In this example, the reverse proxy application 112 would select stack S1 roughly 95% of the time, stack S4 roughly 5% of the time, and stacks S2-S3 roughly 0% of the time. Any suitable values for the stacks weights 404 may be provided, as deemed suitable by an administrator. In one embodiment, the stack weights 404, when summed, should equal 100.

As shown, each stack also includes a plurality of web services versions, such as voting version 402 and voting_admin version 403. Each stack S1-S4 may therefore contain an explicit mapping of abstract service names to concrete versions of web services. Although only two web services are shown, any number of web services may be included in the routing table 400. As shown, voting version 402 has been defined as version 1.2.3, 1.2.3, 1.2.4, and 1.2.4 for stacks S1-S4, respectively. Additionally, voting_admin version 403 has been defined as 2.4.5, 2.4.6, 2.4.5, and 2.4.6 for stacks S1-S4, respectively. Therefore, whenever a specific call is made to a particular stack, or a stack is selected according to the weighted selection criteria, the reverse proxy application 112 is also provided with a version of each web service which should be used to fulfill requests. For example, when stack S2 is called, voting version 1.2.3 and voting_admin version 2.4.6 are used to fulfill the request. If a development team wished to test voting version 1.2.4 and voting_admin 2.4.6, by allocating only 5% of the traffic to stack S4, they may test the newer versions of the web services without allocating 100% of the traffic in a live web services cluster to the untested versions of the web services. Since many errors may arise when software finally goes live, the exposure to errors and downtime may be significantly reduced. Once the development team is satisfied with the performance of voting 1.2.4 and voting_admin 2.4.6, they may increase the stack weight 404 of S4, and decrease the stack weight 404 of S1 accordingly. For example, S4 may receive upwards of 90-100% of the traffic, and S1 may be reduced to 0-10% of the traffic, where the older versions will remain as a standby service for use in failure situations for the newer versions.

Additionally, if the web services are dependent on specific versions of each other, the routing table 400 may be used to enforce these dependencies. Therefore, if voting 1.2.3 is only compatible with voting_admin 2.4.5, each stack in the routing table 400 would only associate voting_admin 2.4.5 with voting 1.2.3.

Embodiments disclosed herein may also be used to test different websites generated by the web services to gauge user behavior and preferences. For example, voting 1.2.3 may have a version A, which generates a list of candidates and presents them to users horizontally. Voting 1.2.3 may also have a version B, which generates the same list of candidates, but presents them vertically. System administrators may be unsure as to which orientation leads to better user participation. To assist in making this determination, embodiments disclosed herein may allocate 50% of traffic to version A, and 50% to version B. Using this split, data may be collected regarding user behavior and preferences to versions A and B of voting 1.2.3, and the more desirable version may be given more weight over time.

If an additional stack S5 were added to the routing table 500, the stack weights 404 could be adjusted to allow some traffic to flow to stack S5. For example, stack S1 could be reduced to 90%, and stack S5 could be provided with 5% of the traffic. Any suitable configuration for the allocation of traffic may be defined. In such a scenario, a caller who does not specify a particular stack has a 90% chance of using stack S1, a 0% chance of using S2-S3, and a 5% chance of using stacks S4-S5.

In another embodiment, another layer of abstraction may be implemented to introduce the notion of "tenants." A tenant is a string which may be associated with each stack S1-S4, and each tenant may give its assignment of weights to stacks. In such an embodiment, the table depicted in FIG. 4 could be viewed as belonging to a single tenant, whose weight distributions are defined in the stack weights 404. However, multiple tenants may be defined, such that they may match to a URL received in an incoming request. For example, three tenants may be defined—"<empty string>", "create/syndication/mickey" and "create/syndication/mym2013". When a URL is received (which does not specify a particular stack), its leading part is matched against all tenants, and the longest match determines the tenant to be used. The empty string is used so it is guaranteed that there is always at least one match. Each tenant has its own weights for stacks S1-S4 (the mappings to the applications remain the same within each stack). Once a tenant is identified, the corresponding weight distribution for that tenant is then known. The weight distribution for the tenant may then be used to select a stack. Therefore, if tenant "create/syndication/mickey" has weights of 0%, 25%, 25%, and 50% for stacks S1-S4, respectively, a call to tenant "create/syndication/mickey" would result in a selection of stack S2 25% of the time, stack S3 25% of the time, stack S4 50% of the time, and stack S1 0% of the time. The selection may be done in many ways, for example, by making a pseudo-random choice based on a hash of IP address and user agent, but any approach such that the selection remains reasonably consistent is suitable. Employing tenants in this way allows stack weights to be shifted for some users of the web services cluster, while the weights for other users remain unchanged. This means, for example, that the voting service can be upgraded for some users of the cluster while others can continue to use the old version.

Advantageously, embodiments disclosed herein provide for easily configurable allocation of traffic in a web services cluster to different versions of web services. Developers may be allowed to test new versions of web services on a limited basis, limiting exposure to the new, untested versions, and decreasing the possibility of failures and service outages. Through the use of a reverse proxy which allocates web traffic based on the weights defined in the reverse proxy routing table, traffic can be routed to specific versions of the web services according to the weights. Changes to the reverse proxy routing table may be made while the web services cluster is fully operational, and can be loaded into the reverse proxy in a second, or faster, depending on hardware and software employed for the reverse proxy.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order or out of order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. A method to manage traffic in a web services cluster using a programmable reverse proxy in the web services cluster, comprising:

defining, in a routing table in the reverse proxy, a plurality of stacks and a weight for each stack of the plurality of stacks, wherein each stack of the plurality of stacks specifies a mapping to at least one version of at least one of a plurality of web services hosted by the web services cluster;

receiving, at the reverse proxy, a URL indicating a request to access a first web service, of the plurality of web services;

selecting one of a first stack and a second stack, of the plurality of stacks, based on the weights of each of the first and second stacks, wherein the first stack specifies a mapping of the first web service to a first version of the first web service, wherein the second stack specifies a mapping of the first web service to a second version of the first web service, wherein each of the first stack and the second stack are selected at least once for a plurality of requests; and generating, at the reverse proxy, an outgoing URL directed to the version of the first web service specified in the mapping of the selected one of the first stack and the second stack.

2. The method of claim 1, further comprising:
forwarding, by the reverse proxy, the request to the outgoing URL to fulfill the request.

3. The method of claim 2, further comprising:
updating the respective weights of the first stack and the second stack in order to specify that all generic requests for the first web service must be fulfilled using the first stack and not the second stack.

4. The method of claim 3, wherein a request specifying the second version of the first web service is fulfilled using the second stack and the second version of the first web service.

5. The method of claim 3, wherein the first version of the first web service is different than the second version of the first web service, the method further comprising:
updating the routing table in the reverse proxy while the web services cluster operates, wherein the updated routing table comprises the updated weights of the first stack and the second stack.

6. The method of claim 1, wherein the weights of each respective stack specify a probability that the respective stack is selected by the reverse proxy in fulfilling web service requests.

7. The method of claim 1, wherein a first version of a second web service is dependent on the first version of the first web service, wherein the first stack associates the first version of the second web service with the first version of the first web service.

8. The method of claim 1, further comprising:
adding, to the outgoing URL, at least one of a query parameter and a header to be processed by the first web service.

9. The method of claim 1, further comprising:
defining, in the reverse proxy, a plurality of tenants, each of the plurality of tenants specifying a respective tenant weight for each of the plurality of stacks.

10. A computer program product to manage traffic in a web services cluster using a programmable reverse proxy in the web services cluster, the computer program product comprising:
a non-transitory computer-readable storage medium having computer-readable program code embodied therewith, the computer-readable program code executable to perform an operation comprising:
defining, in a routing table in the reverse proxy, a plurality of stacks and a weight for each stack of the plurality of stacks, wherein each stack of the plurality of stacks specifies a mapping to at least one version of at least one of a plurality of web services hosted by the web services cluster;
receiving, at the reverse proxy, a URL indicating a request to access a first web service, of the plurality of web services;
selecting one of a first stack and a second stack, of the plurality of stacks, based on the weights of each of the first and second stacks, wherein the first stack specifies a mapping of the first web service to a first version of the first web service, wherein the second stack specifies a mapping of the first web service to a second version of the first web service, wherein each of the first stack and the second stack are selected at least once for a plurality of requests; and generating, at the reverse proxy, an outgoing URL directed to the version of the first web service specified in the mapping of the selected one of the first stack and the second stack.

11. The computer program product of claim 10, the operation further comprising:
forwarding, by the reverse proxy, the request to the outgoing URL to fulfill the request.

12. The computer program product of claim 11, the operation further comprising:
updating the respective weights of the first stack and the second stack in order to specify that all generic requests for the first web service must be fulfilled using the first stack and not the second stack.

13. The computer program product of claim 12, wherein a request specifying the second version of the first web service is fulfilled using the second stack and the second version of the first web service.

14. The computer program product of claim 12, wherein the first version of the first web service is different than the second version of the first web service, the operation further comprising:
updating the routing table in the reverse proxy while the web services cluster operates, wherein the updated routing table comprises the updated weights of the first stack and the second stack.

15. The computer program product of claim 10, wherein the weights of each respective stack specify a probability that the respective stack is selected by the reverse proxy in fulfilling web service requests.

16. The computer program product of claim 10, wherein a first version of a second web service is dependent on the first version of the first web service, wherein the first stack associates the first version of the second web service with the first version of the first web service.

17. The computer program product of claim 10, the operation further comprising:
adding, to the outgoing URL, at least one of a query parameter and a header to be processed by the first web service.

18. The computer program product of claim 10, the operation comprising:
defining, in the reverse proxy, a plurality of tenants, each of the plurality of tenants specifying a respective tenant weight for each of the plurality of stacks.

19. A system, comprising:
one or more computer processors; and
a memory containing a program, which, when executed by the one or more computer processors, performs an operation to manage traffic in a web services cluster using a programmable reverse proxy in the web services cluster, the operation comprising:
defining, in a routing table in the reverse proxy, a plurality of stacks and a weight for each stack of the plurality of stacks, wherein each stack of the plurality of stacks specifies a mapping to at least one version of at least one of a plurality of web services hosted by the web services cluster;
receiving, at the reverse proxy, a URL indicating a request to access a first web service, of the plurality of web services;
selecting one of a first stack and a second stack, of the plurality of stacks, based on the weights of each of the first and second stacks, wherein the first stack specifies a mapping of the first web service to a first version of the first web service, wherein the second stack specifies a mapping of the first web service to a second version of the first web service, wherein each of the first stack and the second stack are selected at least once for a plurality of requests; and generating, at the reverse proxy, an outgoing URL directed to the version of the first web service specified in the mapping of the selected one of the first stack and the second stack.

20. The system of claim 19, the operation further comprising:

forwarding, by the reverse proxy, the request to the outgoing URL to fulfill the request.

21. The system of claim 20, the operation further comprising:

updating the respective weights of the first stack and the second stack in order to specify that all generic requests for the first web service must be fulfilled using the first stack and not the second stack.

22. The system of claim 21, wherein a request specifying the second version of the first web service is fulfilled using the second stack and the second version of the first web service.

23. The system of claim 21, wherein the first version of the first web service is different than the second version of the first web service, the operation further comprising:

updating the routing table in the reverse proxy while the web services cluster operates, wherein the updated routing table comprises the updated weights of the first stack and the second stack.

24. The system of claim 19, wherein the weights of each respective stack specify a probability that the respective stack is selected by the reverse proxy in fulfilling web service requests.

25. The system of claim 19, wherein a first version of a second web service is dependent on the first version of the first web service, wherein the first stack associates the first version of the second web service with the first version of the first web service.

26. The system of claim 19, the operation further comprising:

adding, to the outgoing URL, at least one of a query parameter and a header to be processed by the first web service.

27. The system of claim 19, the operation further comprising:

defining, in the reverse proxy, a plurality of tenants, each of the plurality of tenants specifying a respective tenant weight for each of the plurality of stacks.

* * * * *

UNITED STATES PATENT AND TRADEMARK OFFICE
CERTIFICATE OF CORRECTION

PATENT NO. : 9,288,252 B2  
APPLICATION NO. : 13/833387  
DATED : March 15, 2016  
INVENTOR(S) : Stroomer et al.

Page 1 of 1

It is certified that error appears in the above-identified patent and that said Letters Patent is hereby corrected as shown below:

In the Claims:

Column 10, Claim 1, Line 59, please delete "of the plurality of stacks";

Column 10, Claim 1, Line 67, please delete "each of";

Column 11, Claim 10, Lines 56-57, please delete "of the plurality of stacks";

Column 11, Claim 10, Line 64, please delete "each of";

Column 12, Claim 19, Lines 58-59, please delete "of the plurality of stacks";

Column 12, Claim 19, Line 66, please delete "each of".

Signed and Sealed this  
Thirty-first Day of May, 2016

Michelle K. Lee  
*Director of the United States Patent and Trademark Office*